COMMUNICATION SYSTEM FOR ULTRA SHORT RADIO WAVES

Filed May 21, 1942 4 Sheets-Sheet 1

INVENTORS
HAROLD O. PETERSON,
BERTRAM TREVOR
BY H. G. Grover
ATTORNEY

COMMUNICATION SYSTEM FOR ULTRA SHORT RADIO WAVES

Filed May 21, 1942 4 Sheets-Sheet 2

INVENTORS
HAROLD O. PETERSON,
BERTRAM TREVOR
BY H. G. Grover
ATTORNEY

COMMUNICATION SYSTEM FOR ULTRA SHORT RADIO WAVES

Filed May 21, 1942 4 Sheets-Sheet 3

INVENTORS
HAROLD O. PETERSON,
BERTRAM TREVOR
BY H. S. Grover
ATTORNEY

INVENTORS
HAROLD O. PETERSON,
BERTRAM TREVOR
BY H. S. Grover
ATTORNEY

Patented Feb. 21, 1950 2,497,958

UNITED STATES PATENT OFFICE 2,497,958

COMMUNICATION SYSTEM FOR ULTRASHORT RADIO WAVES

Harold O. Peterson and Bertram Trevor, Riverhead, N. Y., assignors to Radio Corporation of America, a corporation of Delaware Application May 21, 1942, Serial No. 443,932

8 Claims. (Cl. 250—17)

Our present invention relates to communication or signaling on ultra high frequency radio waves.

When signaling with ultra high frequency radio waves having, for example, a wave length of the order of ten centimeters or a frequency of the order of 3000 megacycles, it will be found that physical obstructions cast rather sharp shadows. These may be avoided by mounting the signaling antennas well above such obstacles. However, since it may not be possible, desirable or practicable to locate a single omni-directional antenna above all nearby obstructions which cast such shadows, it is an object of our present invention to overcome this difficulty and to provide an omni-directional communication system for ultra short waves employing directive antennas, which system does not require unduly high supporting structures.

For example, suppose it is desired to locate an ultra short wave antenna half way up a large cylindrical tower which would cut off most of the radiation in a direction in back of the antenna; the system may be made non-directive by using two directive antennas opposite each other on the tower. Each antenna would be so designed to cover uniformly, in a horizontal plane, a little more than 180 degrees. Such an antenna arrangement having a uniform characteristic over a range somewhat greater than 180 degrees is described in detail in the copending U. S. application of J. B. Atwood, Serial No. 441,659, filed May 4, 1942, now Patent No. 2,401,601, granted June 4, 1946.

However, if both of these antennas were fed simultaneously there would be many dead spots in the radiation pattern because of cancellation of the radiated waves and fields in certain directions in space. To overcome such dead spots is a further object of our present invention and this object is fulfilled by providing a system in which the two antennas are fed alternately at a rate substantially above the highest audio or, more generally, above the highest modulation frequency to be transmitted. By such an arrangement, a uniform field distribution in all directions is secured without dead spots from shadows or the cancellation points from two simultaneous transmissions on the same frequency. Incidentally, it is to be noted that the invention is not necessarily limited to transmission, but may be used equally well for reception.

In modifications of our invention which are described herein several important advantageous features may be employed such as, for example, the use of a pulse frequency oscillator to control the switching of power from one antenna to another and to simultaneously control the frequency of the pulses of variable length fed to the antennas; and the use of antennas of different heights as well as the use of different operating frequencies to overcome zones of low signal intensity or so-called dead spots. These various features are used singly or in combination as will be described more fully later.

Other objects, features and advantages of our invention will be apparent as the more detailed description thereof proceeds. This description will be given in connection with the accompanying drawing wherein.

Figure 3:
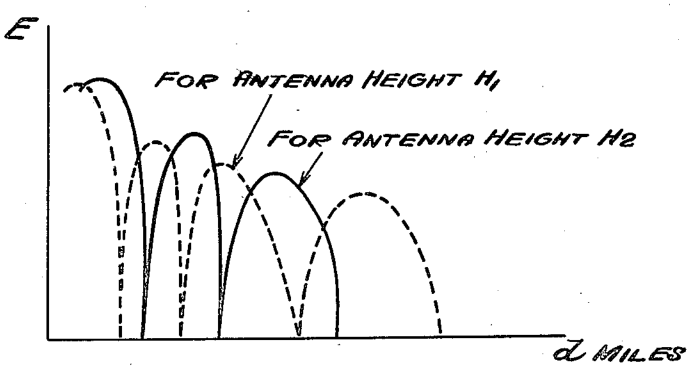
Figure 3 is a graph illustrating variations in zones of low intensity along the earth's surface for antennas of varying heights or for antennas operating on different wave lengths.
Figure 4:
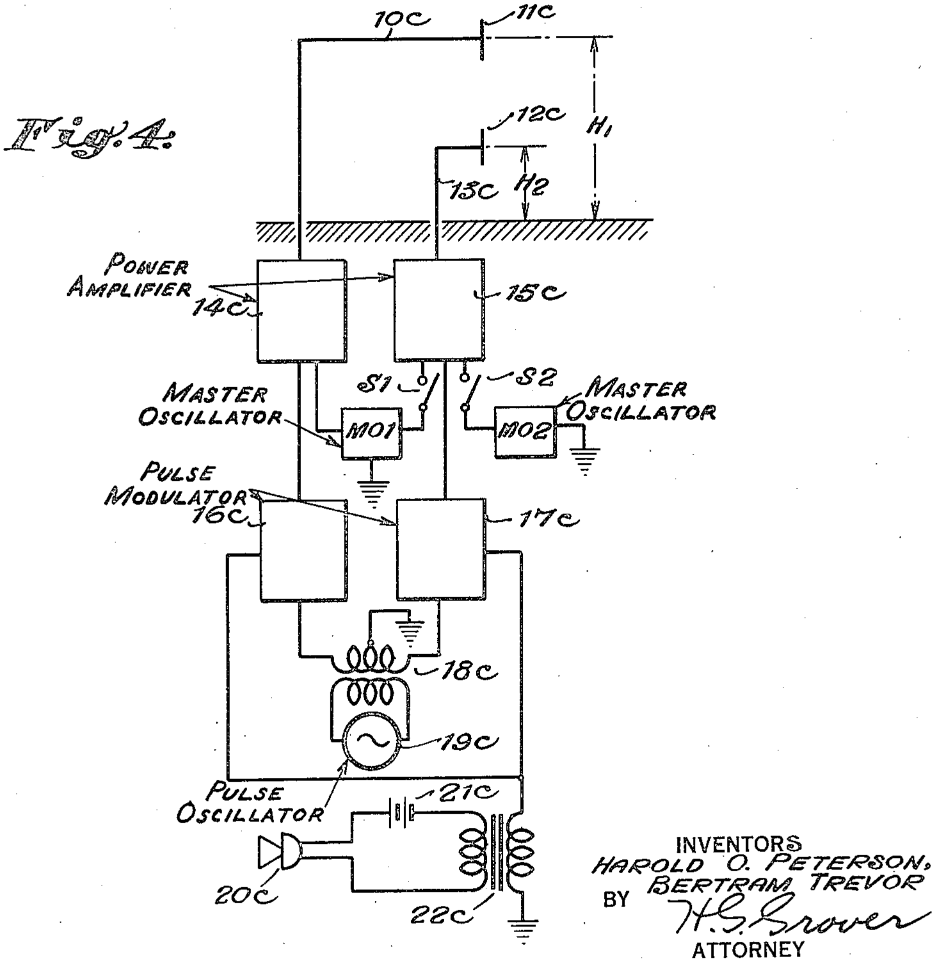
Figure 5:
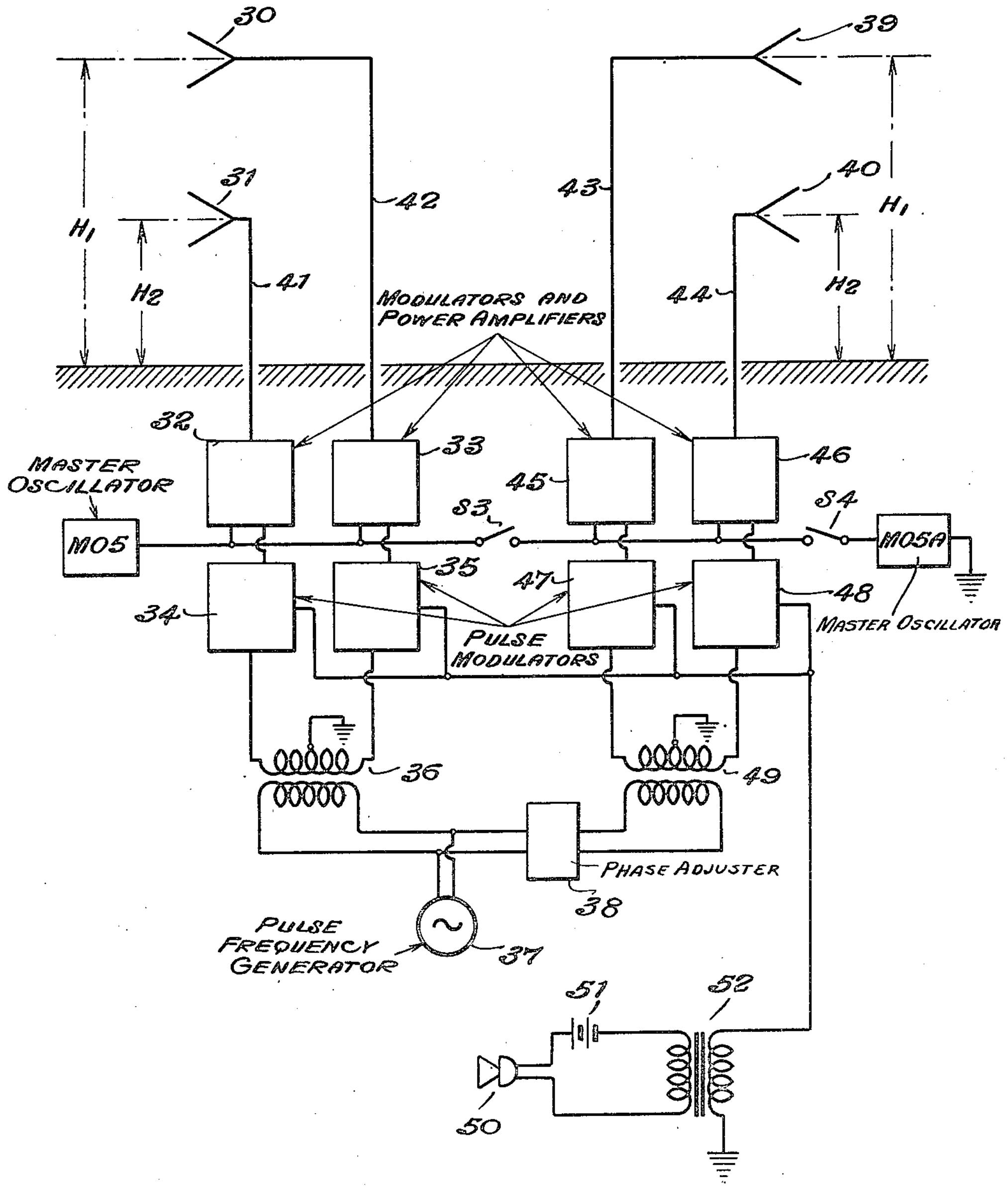

Figure 4 illustrates a transmitting arrangement for alternately exciting antennas of different heights so as to avoid the dead spots of Figure 3. It is to be noted in Figure 4 that the antennas may be excited with carrier energy of the same or different frequencies; and Figure 5 illustrates a modification of Figure 4 wherein pulses are radiated alternately from antennas at two different heights and in two directions. In connection with Figure 5 it is to be noted that all antennas may be operated on the same carrier frequency, or each pair of antennas may be operated at a different carrier frequency or, if desired, all of the antennas illustrated may each be operated on one of four different carrier frequencies.

Figure 1:
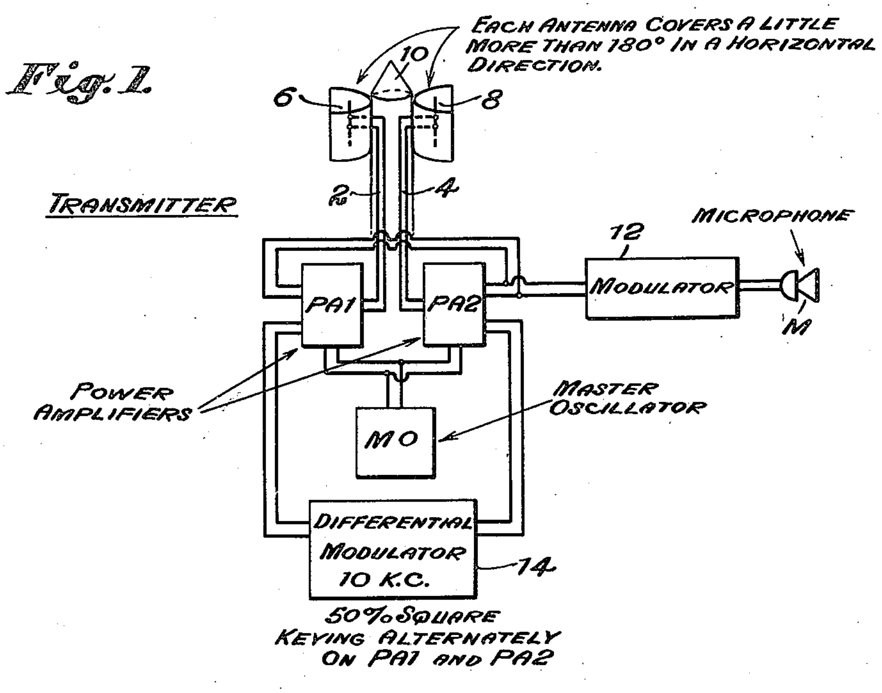
Figure 1 illustrates an arrangement for alternately exciting two antennas, each having a uniform radiation characteristic over something more than 180 degrees, with modulated ultra short waves.

Referring to the transmitting system of Figure 1, a single master oscillator MO generating a suitable carrier frequency, for example, 3000 megacycles, is fed to a pair of power amplifiers PA1 and PA2. The outputs of the power amplifiers are fed through transmission lines 2, 4 to a pair of directive antennas 6, 8 mounted upon a tower or other suitable support 10. The waves appearing in the output circuits of the power amplifiers, namely, in the transmission lines 2, 4, are modulated by the modulating waves here indicated to be audio frequency waves, developed by microphone M, fed to the modulator 12. The modulator 12, as illustrated, is suitably coupled to the power amplifiers so as to modulate the outputs thereof in any desired manner as, for example, to produce phase, frequency or pulse modulated outputs which are to be fed to the antennas 6, 8 through transmission lines 2, 4.

The power amplifiers PA1 and PA2 are also differentially keyed on and off at a rate higher than the highest modulating frequency. For example, if the highest modulating frequency is from 3000 to 5000 cycles, the power amplifiers PA1 and PA2 are alternately turned on and off by the differential modulator 14 at a ten kilocycle rate. In this way, either the antenna system 6 or only antenna 8 is being energized at any given instant. In other words, there is 50% square keying alternately on PA1 and PA2.

The antenna systems 6, 8 are arranged to have a uniform horizontal directivity pattern of a little more than 180 degrees and they may have any desired amount of directivity in the vertical plane. Preferably, antenna systems 6, 8 are built along the lines of Figures 3 and 4 of the copending application of J. B. Atwood, Serial No. 441,659, filed May 4, 1942. By the use of such antenna systems for 6 and 8, non-directional or omni-directional transmission and reception are achieved with directive relatively high gain antennas.

Figure 1A:
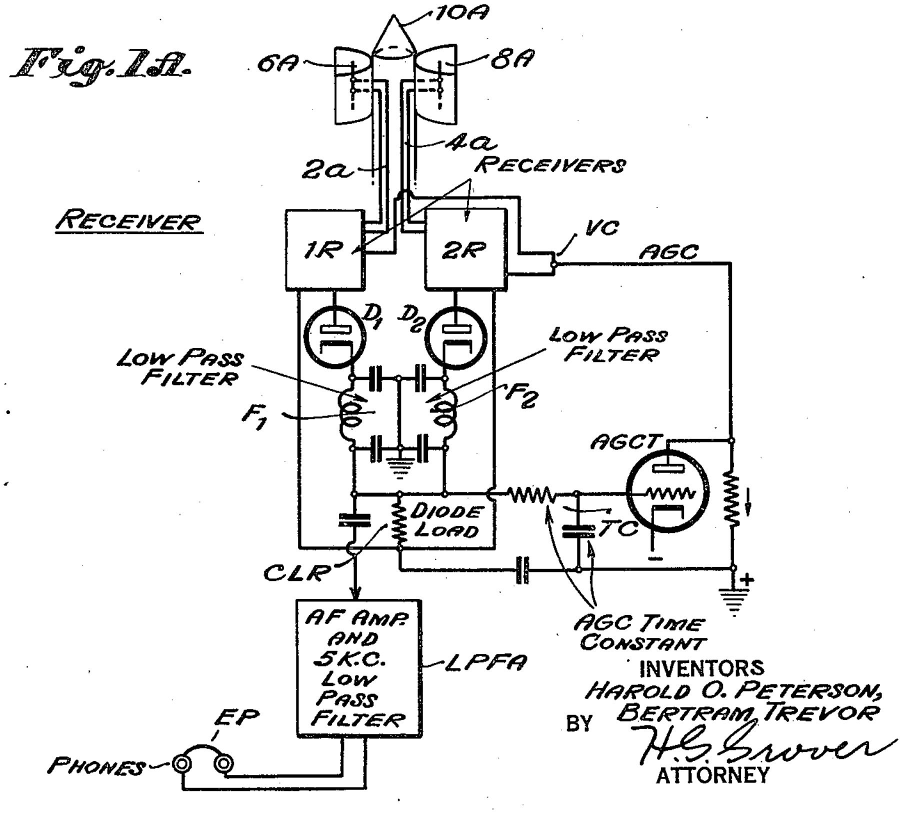
Figure 1A is a schematic diagram of a receiving system which may be used for receiving transmissions from Figure 1.

Figure 1A diagrammatically illustrates a receiving system employing the principles of our invention. In Figure 1A two antennas 6A and 8A, similar to antennas 6 and 8 of Figure 1, are used to feed through suitable transmission lines 2A and 4A separate receivers 1R and 2R. A diode detector D1 is provided for receiver 1R and a separate diode detector D2 is provided for receiver 2R. The diode detectors D1 and D2 are provided with separate low pass filters F1 and F2 both of which work into a common load resistor CLR from which audio or modulation frequency waves are obtained to feed a low pass filter and audio amplifier LPFA. The filter LPFA is designed so as to cut off all frequencies above the highest modulation frequency transmitted which, in the event the highest transmitted frequency is 5000 cycles, would be 5000 cycles. As a consequence, the differential modulator frequency of, for example, 10,000 cycles generated at 14 in Figure 1 is prevented from passing into the translating device, here shown as earphones EP.

The low pass filters F1 and F2 associated with each of the diodes D1, D2 of Figure 1A suppress frequencies of the received carrier frequency or of the final intermediate frequency and higher frequencies used in the receivers 1R and 2R.

It is to be noted that the receiving arrangement of Figure 1A allows reception from all directions despite presence of the large cylindrical tower 10A or other supporting structure which may extend substantially above the antennas 6A and 8B.

Also as illustrated in Figure 1A, the common load resistor CLR feeds through a suitable time constant circuit TC, an automatic gain control tube AGCT in turn supplying automatic gain control voltages through connections VC. Further, it is to be noted that while the upper modulating frequency has been indicated to be 5000 cycles and the differential modulator frequency to be 10,000 cycles, other values may be used. For example, the highest modulating frequency transmitted may be 15,000 cycles for high quality voice transmission and in that event the differential modulator 14 of Figure 1 should be operated at a higher frequency, for example, 50,000 cycles.

Figures 2, 2A:
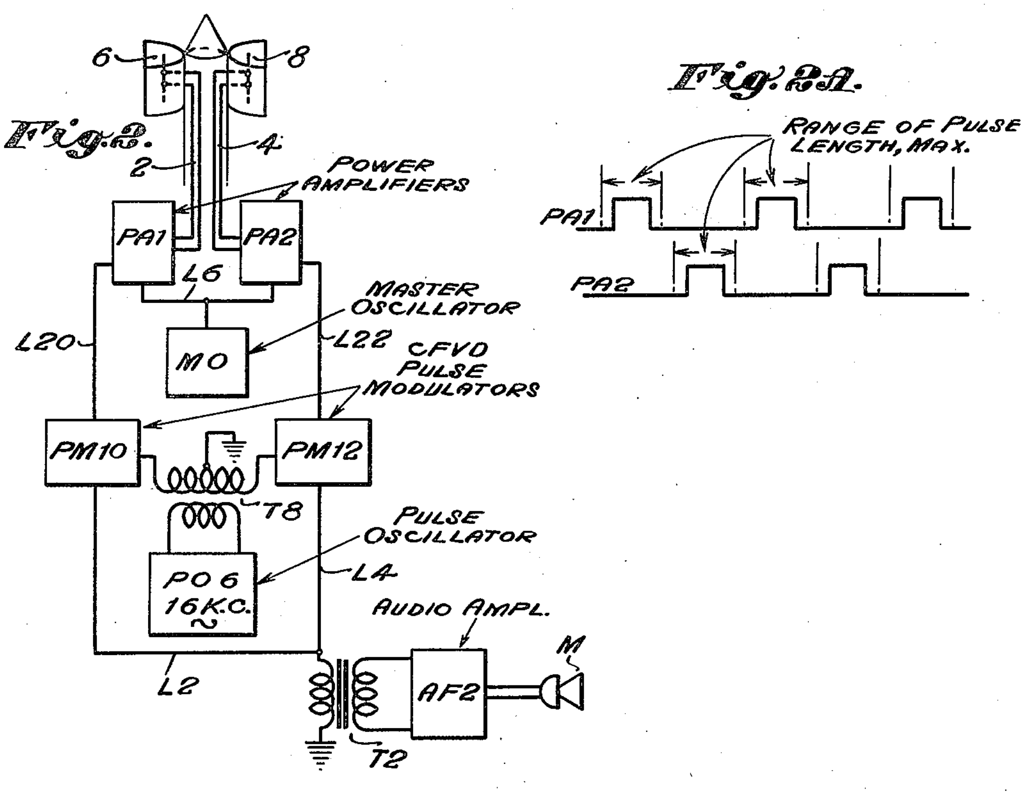
Figure 2 is a modification of the transmitting system of Figure 1 and is characterized by the use of pulse modulation and further by the fact that the pulse modulator controls the alternate excitation of the antennas.
Figure 2A is a graph explanatory of the action of Figure 2.

Figure 2 illustrates an arrangement similar to Figure 1, but Figure 2 is characterized by the employment of pulse modulation and further by the fact that the pulse oscillator is used to control switching from one antenna to another. In the type of pulse modulation used in Figure 2 the length of the pulses is varied in accordance with the percent of modulation. This type of modulation is sometimes referred to as constant frequency variable dot modulation. One hundred percent modulation in this case corresponds to a maximum pulse length of fifty percent mark and this approaches zero percent at zero percent modulation. In the arrangement of Figure 2 the width of pulses varies from zero to fifty percent for each of the power amplifiers PA1 and PA2, and since the amplifiers are keyed on and off differentially or alternately only one will be delivering power at a given time. The adjustments may be made such that in the case of zero audio or no modulation, each transmitter or power amplifier is being keyed with twenty-five percent pulses and in the case of one hundred percent modulation with fifty percent pulses.

Specifically referring to Figure 2, the pulse oscillator PO6 feeds waves of pulse frequency, for example, sixteen kilocycles through transformer T8 to the pulse modulators PM10 and PM12. These pulse modulators are of the constant frequency variable dot type and are simultaneously fed with modulation voltages through the lines L2, L4. As shown, the lines L2, L4 are connected in parallel and to the secondary of transformer T2 in turn supplied by audio frequency amplifier AF2 controlled by microphone M. The pulse oscillator PO6 performs two functions, namely, it fixes the frequency of pulses fed by the pulse modulators PM10, PM12 through lines L20 and L22 to the power amplifiers PA1 and PA2 and, secondly, the oscillator PO6 alternately turns on and off the power amplifiers PA1 and PA2 through the action, of course, of the pulse modulators PM10 and PM12. The pulse modulators PM10 and PM12 only vary the length of the pulses fed to the power amplifiers and not the rate of the pulses which, as before stated, is controlled by the pulse oscillator PO6.

The relative timing of the excitation of the power amplifiers PA1 and PA2 of Figure 2 and the range of pulse length for maximum modulation is diagrammatically illustrated in Figure 2A. It is to be noticed that the pulses increase and decrease in length, according to the modulation, simultaneously in the outputs of each of the power amplifiers PA1 and PA2 and that both power amplifiers never feed energy simultaneously to both antenna systems 6 and 8.

In Figure 2, of course, it is assumed that the highest audio or modulating voltage is of the order of 5000 cycles. In the event that the highest modulating frequency were higher, say, 15,000 cycles, then, of course, the frequency of the pulse oscillator PO6 should be increased so as to be considerably higher than the highest modulating frequency and in the case assumed might be of the order of 50,000 cycles.

Figures 2B, 2C:
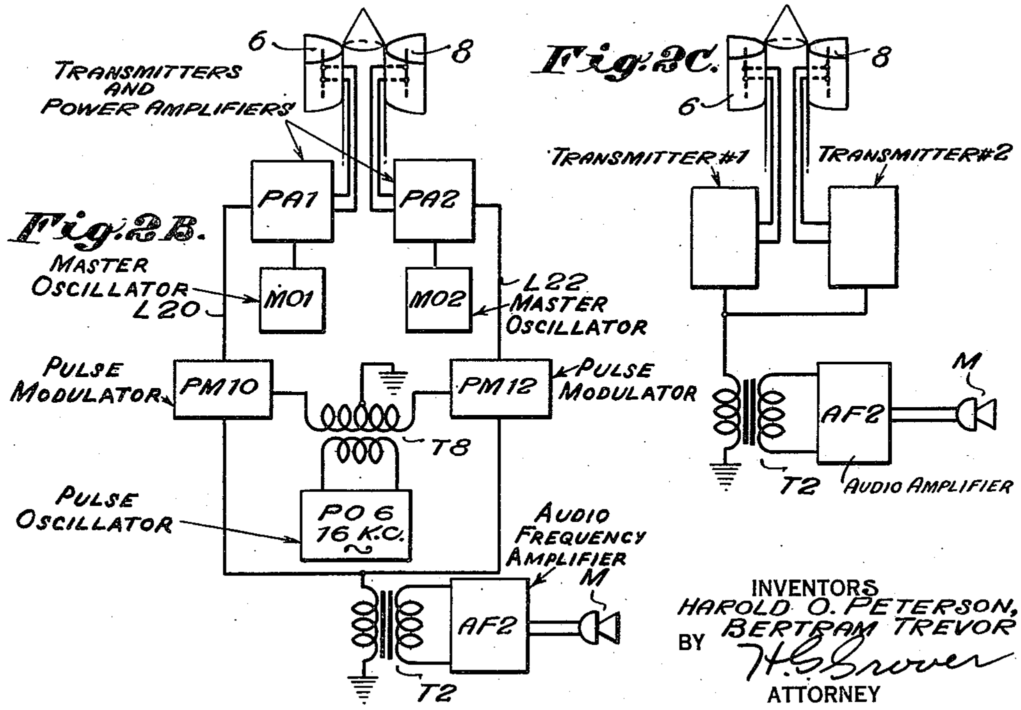
Figure 2B is a modification of Figure 2 wherein transmissions occur alternately on different carrier frequencies.
Figure 2C is another modification of Figure 1 wherein the same signal is oppositely radiated from oppositely directed antenna systems simultaneously on carriers of different wave lengths.

A modification of our invention is illustrated in Figure 2C wherein the antenna systems 6, 8 are fed continuously with two different radio frequency waves derived from transmitter 1 and transmitter 2. These transmitters are modulated simultaneously with amplified waves derived from microphone M, audio frequency amplifier AF2 and transformer T2. The type of modulation on the waves radiated from antennas 6 and 8 may be, therefore, amplitude, phase, frequency or pulse modulation. At the receiving end, two receivers would preferably be used, tuned, respectively, to these different radio frequencies and the receivers would be so connected as to feed, in parallel, a common audio amplifier. The system of Figure 2 would also be free of dead spots or shadows cast by obstacles since the received waves would come in on one wave length or another over the entire 360 degree range. The receiving system for the transmitter of Figure 2C would be arranged as illustrated in Figure 1A with the exception that the two receivers 1R and 2R would be tuned respectively to the frequencies transmitted by the antennas 6 and 8 of Figure 2C.

The transmitting system of Figure 2B combines the features of Figures 2 and 2C. Transmissions from Figure 2B may be received on the receiving system of Figure 1A.

Thus, referring to Figure 2B the pulse modulating arrangement is the same as that illustrated in Figure 2 wherein the power amplifiers PA1 and PA2 are switched or alternately excited under control of the pulse oscillator PO6. However, in Figure 2B each power amplifier is fed with a different radio frequency carrier derived from master oscillators MO1 and MO2 so that the radiations from antennas 6, 8 are alternate and at different frequencies.

As already explained, when signaling with very short waves shadows or dead spots are caused by obstacles in the path of the transmitted waves. Similar dead spots are produced when short wave signals are transmitted from a considerable altitude as, for instance, from the mast of a ship. For example, consider two antennas of different heights H1 and H2 located on a tall mast of a ship. The voltage picked up from these two antennas at varying distances from the mast is roughly indicated in Figure 3 where the solid line would indicate the variations in signal strength from the antenna at a height H2 and the dotted line would indicate the variations in signal strength for the antenna at the height H1. The zones of low intensity illustrated in Figure 3 are produced by destructive interference between the direct ray and the ray reflected from the earth's surface which, in the case assumed, would be the surface of the water. The locations of the zones of low intensity depend upon the wave length and heights above ground of the transmitting and receiving antennas. In accordance with another aspect of our invention, two antennas of different heights operating at the same or different frequencies are employed to substantially eliminate dead spots or zones of low intensity when signaling on very short waves of, for example, the order of 3000 megacycles.

Specifically, a transmitting system for avoiding the loss of transmission due to the occurrence of these zones of weak signal strength is illustrated in Figure 4. The two antennas 11C and 12C are arranged at different heights so as to have displaced zones of low intensity as illustrated in Figure 3. That is to say, for example, antenna 11C may be adjusted at such a height as to have the characteristic illustrated by curve H1 of Figure 3 and antenna 12C may be adjusted to such a height as to have a characteristic illustrated by curve H2 of Figure 3 so that at all times, within the range of the system, a substantial signal is received from either or both of the transmitting antennas. The antennas are preferably omnidirectional and if placed on board ship may be of the type described in Figure 7 of the patent application of J. B. Atwood referred to hereinabove. The antennas 11C and 12C may, if desired, be directional over something more than 180 degrees and in this case they preferably are of the type described by J. B. Atwood in his copending application referred to and in particular in Figures 3 and 4 thereof. In this event, the antennas 11C and 12C of Figure 4 may be aimed in the same direction or in opposite directions. The antennas, as just described, may be used at the receiving station of Figure 1A, in which event the antennas 6A and 8A of Figure 1A would be supported at different heights and in accordance with the principles outlined in connection with Figure 3 herein.

Referring again to Figure 4, it will be noted that the transmitter arrangement is similar to that described in Figure 2. Transmitters or power amplifiers 14C and 15C radiate alternate pulses generated by the pulse generators under control of the pulse modulators 16C and 17C. The carrier frequency of the radiated pulses is that of the master oscillator MO1 when switch S1 is closed and switch S2 is open. When transmitting at different frequencies, switch S1 is left open and switch S2 is closed, in which event the frequency of radiation from antenna 11C is that of the master oscillator MO1 and the frequency of radiation from antenna 12C is different, then being, when switch S2 is closed, the frequency of operation of master oscillator MO2. The timing of the radiated pulses from antennas 11C and 12C is controlled by a wave of super-sonic frequency generated by oscillator 19C which is coupled differentially to the pulse modulators 16C and 17C through transformer 18C. The pulse modulators 16C and 17C are excited cophasally with modulation waves derived from microphone 20C and transformer 22C so that the pulse outputs of modulator 16C and 17C which at the frequency of the pulse oscillator 19C would vary in length or duration, as before explained in connection with Figures 2 and 2A, in accordance with the signal at 20C.

Figure 5 shows a system whereby pulses are radiated alternately from antennas at two different heights and also in two different directions to avoid the interference of a local obstacle such as the supporting tower 10 of Figure 1. In the system of Figure 5 antennas 30 and 31, supported at different heights H1 and H2, radiate in the same general direction. Antennas 39 and 40 are also supported at different heights H1 and H2 and are arranged to radiate in the opposite direction. If desired, antennas 39 and 40 may be arranged at heights respectively H3 and H4 which are different than the heights H1 and H2. The horizontal directivity of all of the antennas 30, 31, 39 and 40 may be made approximately 180 degrees wide if effective radiation is desired in all directions. In this event, each antenna may be made in the form illustrated in Figures 3 and 4 of the J. B. Atwood application hereinabove referred to.

Transmitters or radio frequency power amplifiers 32 and 33 radiate pulses alternately, the timing being controlled by waves of super-sonic frequency generated by oscillator 37 and fed through transformer 36 to the pulse modulators 34 and 35. The pulse modulators 34 and 35, as before explained, produce pulses of varying length, but of a frequency controlled by pulse generator 37.

Transmitters or power amplifiers 45 and 46 also radiate pulses alternately over the other antennas 39, 40, the timing being controlled by the same super-sonic oscillator 37 which, however, feeds the pulse modulators 47 and 48 through a phase adjusting network 38 and transformer 49. The phase adjuster 38 may be constructed in any known way and is adjusted so as to produce a phase change such that the pulses radiated by power amplifiers 45 and 46 will occur midway between the pulses radiated by transmitters or power amplifiers 32 and 33.

As in connection with Figures 2 and 4, all of the pulses are modulated cophasally or simultaneously by waves picked up on microphone 50 and fed to all of the pulse modulators 34, 35, 47 and 48 through the secondary of transformer 52. The radio frequency carrier wave is supplied by a master oscillator MO5 which, when switch S3 is closed and S4 is open, supplies waves of the same frequency to each of the radio frequency transmitters, power amplifiers or modulators 32, 33, 45 and 46. When this is done, a simple receiver will receive signal energy at any distance and at any direction or height above ground within the range of the transmitters 32, 33, 45 and 46.

If desired, switch S3 may be opened and switch S4 closed, in which event the radiation from antennas 30 and 31 will be at a frequency controlled by the master oscillator MO5 and the radiation from antennas 39 and 40 will be at a different frequency corresponding to that derived from master oscillator MO5A. Or, if desired, a separate master oscillator, each operating at a different frequency, may be connected so as to supply the transmitters 32, 33, 45 and 46 so that the radiations from antennas 30, 31, 39 and 40 will be of different frequencies. Where radiation occurs at different frequencies several receivers feeding into a common modulation or signal output circuit should be provided each receiver having its radio frequency circuits tuned to a different one of the radiated frequencies.

As a further alternative, master oscillator MO5 may be used to control the radiation frequency of antenna 31 and antenna 39 and master oscillator MO5A may be used to supply radio frequency waves of a different frequency to antennas 30 and 40.

Having thus described our invention, what we claim is:

1. The method of signaling which includes generating a plurality of carriers of different frequency, pulse modulating the carriers with the same signal and alternately radiating from different, closely adjacent points, the carriers in opposite directions over an angle greater than 180 degrees at a frequency corresponding to the pulse frequency.

2. In combination, a pair of oppositely directed directive antennas each adapted to radiate over a horizontal angle greater than 180 degrees, a source of pulse modulated waves, and instrumentalities for alternately feeding the pulse modulated waves to said antennas separately at a rate equal to the pulse frequency.

3. The method which includes generating a carrier wave energy, generating pulses of constant frequency, modulating the length of the pulses, modulating the carrier wave with the modulated pulses, and alternately radiating the modulated carrier from physically and electrically separated points at an alternation rate equal to the pulse frequency.

4. In combination, a pulse oscillator, apparatus for modulating the length of pulses derived from said oscillator, apparatus for generating carrier waves, circuits for modulating said carrier waves with said modulated pulses, a pair of output circuits, and switching circuits under control of the pulse oscillator for alternately exciting said output circuits with said modulated carrier waves at an alternation rate equal to the frequency of the pulse oscillator.

5. In combination, a pulse oscillator, apparatus for modulating the length of pulses derived from said oscillator, apparatus for generating carrier waves, circuits for modulating said carrier waves with said modulated pulses, a pair of output circuits, a pair of oppositely aimed antenna systems connected to said output circuits, and switching circuits under control of said pulse oscillator for alternately exciting at pulse frequency rate said output circuits with said modulated carrier waves.

6. In combination, a pair of antennas, an amplifier individual to and supplying waves to said antennas, a source of carrier waves connected to said amplifiers, a pulse oscillator, a source of signals, a pair of pulse modulators supplied with waves from said source of signals for modulating said pulses, one of said pulse modulators being connected to one of said amplifiers and the other to the other of said amplifiers, and switching circuits under control of waves from said source of pulse oscillations for alternately controlling the outputs of said amplifiers at pulse frequency which is given a value higher than the highest modulating frequency.

7. The method of overcoming shadows caused by obstacles when communicating on ultra short waves of the order of ten centimeters in length which includes generating a plurality of carrier waves of different frequency, pulse modulating the carriers with the same signal and alternately radiating the carriers from different, closely adjacent points, in opposite directions over an angle greater than 180 degrees at a frequency corresponding to the pulse frequency.

8. In a radio frequency system, the steps of alternately producing radio frequency carrier signals of two different frequencies in the form of consecutive pulses of given time duration, and modulating said carrier pulses in accordance with a modulating signal.

HAROLD O. PETERSON.
BERTRAM TREVOR.

REFERENCES CITED

The following references are of record in the file of this patent:

UNITED STATES PATENTS

| Number | Name | Date |
| --- | --- | --- |
| 1,821,383 | Goldsmith | Sept. 1, 1931 |
| 1,853,021 | Alexanderson | Apr. 12, 1932 |
| 1,863,518 | Young | June 14, 1932 |
| 1,973,296 | Schroter | Sept. 11, 1934 |
| 2,033,271 | Aiken | Mar. 10, 1936 |
| 2,080,081 | Loth et al. | May 11, 1937 |
| 2,095,774 | Taylor | Oct. 12, 1937 |
| 2,159,647 | Alford | May 23, 1939 |
| 2,189,317 | Koch | Feb. 6, 1940 |
| 2,189,549 | Hershberger | Feb. 6, 1940 |
| 2,213,859 | Hahnemann | Sept. 3, 1940 |
| 2,227,108 | Roosenstein | Dec. 31, 1940 |
| 2,262,838 | Deloraine et al. | Nov. 18, 1941 |
| 2,290,692 | Lindenblad | July 21, 1942 |
| 2,297,228 | Kramar | Sept. 29, 1942 |
| 2,320,521 | Kear | June 1, 1943 |
| 2,328,944 | Beatty | Sept. 7, 1943 |

FOREIGN PATENTS

| Number | Country | Date |
| --- | --- | --- |
| 540,233 | Great Britain | Oct. 9, 1941 |